United States Patent Office 2,819,995
Patented Jan. 14, 1958

2,819,995

INSECT REPELLENT STICKS

Helen E. Wassell, Pittsburgh, Pa., assignor to Union Carbide Corporation, a corporation of New York No Drawing. Application February 18, 1954
Serial No. 411,287

6 Claims. (Cl. 167—42)

This invention relates to insect repellent sticks containing 2-ethylhexanediol-1,3.

The insect repellent properties of 2-ethylhexanediol-1,3 are well known and it has been proposed to prepare a soap-gel stick comprising this insect repellent as the active ingredient, the gel being produced with varying amounts of sodium stearate and water. In addition, the soap-gel stick may contain one or more added ingredients such as alcohol, a glycol, glycerine, perfume and dye. Such sticks, however, have numerous disadvantages which it is the object of the present invention to overcome.

In the soap-gel stick the soap may be an irritant to persons with tender skin and those allergic to soap. Furthermore, soap is an emulsifying agent and when an insect repellent film containing soap is mixed with water it is emulsified and readily removed with more water. Thus, when a person perspires freely, is splashed with water from rain or while in a boat, or goes in swimming, the film of insect repellent containing soap is removed very readily. Also, where the sticks contain readily volatile fluids, for instance water or alcohol which are usually present in soap-gel compositions, the sticks have a poor shelf life, becoming hardened and shrunken to some extent on the dealer's shelves and to a greater extent and more quickly after the wrappings are removed by the user. The shrinkage and the hardening of soap-gel sticks is particularly noticeable in those containing comparatively high contents of alcohol, water or other volatile material. A soap-gel stick containing alcohol or water must be wrapped in metal foil and placed in an air-tight container to reduce water-loss and hardening during storage. The soap-gel sticks are light-colored, more or less transparent and substantially odorless when freshly prepared except for the odor of alcohol or perfume which may be present; but they darken and frequently develop a noticeably unpleasant odor on storage.

The insect repellent stick of the present invention overcomes the disadvantages of a soap-gel stick. The stick herein described contains no soap and only bland, neutral ingredients. The components of the stick are insoluble in water and reduce rather than increase any tendency for the composition to be removed with water. Thus the stick is resistant to deterioration by perspiration and it is not easily removed by water although it may be washed off by being emulsified with soap or other detergent. The repellent sticks of the present invention do not dry out, harden or become unsatisfactory upon storage and they retain their original characteristics of softness while in intermittent use by the consumer. Sticks of the compositions herein described can be packaged in metal push-up containers without noticeable change in hardness or softness or size on long storage; and packaging in air-tight containers is unnecessary. Furthermore, sticks of the compositions herein disclosed are white and substantially odorless and remain so under conditions of long storage or intermittent use. Sticks of the compositions disclosed herein substantially liquefy when rubbed on the skin yet retain such firmness that they do not liquefy, soften or run under normal variations in temperature such as would be encountered during storage, either storage on a dealer's shelves or when carried by the user, but remain as firm, smooth, homogeneous compositions; nor do the compositions produce sticky or tacky films; nor do the sticks sweat or bleed the diol.

In efforts to produce the sticks of the present invention various waxes such as beeswax, carnauba and petroleum waxes were tried alone and in combination with each other to produce a satisfactory solid stick in combination with 2-ethylhexanediol-1,3. Most of the waxes and combinations were soluble in the hot diol and produced combinations of varying degrees of hardness upon cooling but none were satisfactory for a stick repellent because they either did not liquefy when rubbed on the skin or were of a poor color and/or produced tacky films on the skin. It was attempted to prepare sticks from stearic acid and the diol but a composition containing as much as 35 percent stearic acid was too soft for a satisfactory stick. Combinations of stearic acid, beeswax and carnauba wax were tried but none produced a satisfactory stick. Ozokerite wax was tried in combination with the diol but the wax was soluble only in very hot diol (above 160° C.) and when the clear hot solution was cooled a grainy mixture resulted.

During the course of the experimental work, however, it was found that compositions composed essentially of certain proportions of ozokerite wax with triple pressed stearic acid in conjunction with 2-ethylhexanediol-1,3 gave compositions which could easily be prepared at a low temperature and which when poured into molds and cooled gave smooth, white, homogeneous sticks of desirable hardness from which the diol would not sweat and which would retain the stick form and have the other desirable characteristic hereinbefore described but which liquefied sufficiently at body temperature when rubbed gently over the skin to produce a film of the composition which could readily be deposited over a large surface and which contained a high proportion of the diol and were very effective in repelling insects but were neither tacky nor sticky. Satisfactory sticks were prepared in accordance with the following compositions:

| | Parts by weight | | | |
|---|---|---|---|---|
| | No. 1 | No. 2 | No. 3 | No. 4 |
| 2-ethylhexanediol-1,3 | 65.0 | 70 | 70 | 75 |
| Stearic acid (triple pressed) | 23.4 | 20 | 22 | 18 |
| Ozokerite wax (Cornelius Product Co.), M. P.=190 to 195° F | 11.6 | 10 | 8 | 7 |

In preparing the sticks the wax, stearic acid, and half of the diol were heated until a clear melt was obtained at 105 to 110° C. The remainder of the diol was added and stirred into the melt until the diol was incorporated and the melt became clear. The clear melt was then poured into molds and allowed to cool. Higher and somewhat lower temperatures may be used in preparing the melt but the preferred temperatures are those given thereby affording a speedy production of a uniform product without undue heating. The sticks thus formed withstood variations in temperature from 0° to 130° F. without marked effects and remained as firm, smooth, homogeneous compositions.

The solution temperature and hardness of the sticks vary somewhat with the proportion of stearic acid to ozokerite wax and with the proportion of the diol to the stearic acid-wax combinations. In experimenting with various formulations and the preparation of the sticks, it was found that the ozokerite wax in combination with the acid had the property of retaining the diol in solidified solution and prevented the diol from sweating out of the cooled sticks. The higher the proportion of wax to acid, the higher the temperature (above the 110° C. previously mentioned) required to produce a clear melt, but once a clear melt was obtained and the sticks formed, the softer was the stick.

Although solid compositions may be obtained with lower melting point ozokerite wax, the preferred wax should be pure, refined and white with a high melting point of from 190 to 195° F.

The stearic acid which is used is triple pressed, or its equivalent, containing approximately 50 percent each of stearic and palmitic acids with a minimum amount of oleic acid. Commercial stearic acid is usually a mixture of about equal parts of palmitic and stearic acids with varying amounts of oleic acid, the oleic acid being almost completely removable by pressing or distillation. The triple pressed stearic acid has substantially all of the oleic acid removed. Substantially pure stearic acid (97 percent stearic, 1 to 2 percent palmitic and less than 1 percent oleic acids) produced sticks which deposited a film on the skin which was heavier, smeary and less desirable than those made from triple pressed stearic acid. A fatty acid, containing 70 percent stearic, 29 percent palmitic and 1 percent oleic acids, produced a stick of fair hardness and filming properties but it is preferred to use a fatty acid containing about equal amounts of stearic and palmitic acids. When palmitic acid (70 percent palmitic, 26 percent stearic and small amounts of myristic and oleic acids) was used the stick was satisfactory but at the limit of softness. Sticks made with other fatty acids, such as oleic and lauric were unsatisfactory because of their undesirable consistency, color and/or odor. Various waxes such as carnauba, candelilla, beeswax, paraffin and spermaceti were tried in place of ozokerite wax with triple pressed stearic acid and the diol but the sticks produced were unsatisfactory because of hardness, color, odor and/or film properties.

When the diol was replaced with ortho-dimethyl phthalate, the mixture became clear upon heating to 135° C. but separated into layers before solidification upon cooling. When a mixture of equal parts of 2-cyclohexylcyclohexanol and 2-phenylcyclohexanol was used to replace all of the diol, the mixture cleared below 90° C. but a liquid separated as the sticks cooled and the cooled composition was too soft. However, where any amount of the diol up to 70 percent was replaced by ortho-dimethyl phthalate, or 2-cyclohexylcyclohexanol or 2-phenylcyclohexanol or mixtures thereof and the formulation included ozokerite wax and triple pressed stearic acid in the formulations previously given, the diol apparently held the phthalate or the hexanol in solid solution in the ozokerite wax-stearic acid composition and satisfactory sticks were produced.

A small amount of perfume or coloring matter, or both, may be used in the compositions contemplated herein but concentrated perfumes, dyes and the like should be used so as not to change materially the characteristics of the compositions which consist essentially of the ingredients in the proportions described.

What is claimed is:

1. Method of preparing an insect repellent stick which comprises heating, until a clear melt is obtained, a mixture consisting essentially of from about 65 to 75 parts of an insect repellent, from about 18 to 23.4 parts of fatty acid, and from about 7 to 11.6 parts of ozokerite wax, the repellent comprising about 30 percent 2-ethylhexanediol-1,3 and about 70 percent of a member selected from the group consisting of 2-ethylhexanediol-1,3, ortho-dimethyl phthalate, 2-cyclohexylcyclohexanol, 2-phenylcyclohexanol and mixtures thereof, the fatty acid being a mixture of stearic acid and palmitic acid containing from about 26 parts to 70 parts of stearic acid, all parts by weight, pouring the melt into molds while it is clear and hot, and cooling the melt in the molds to a substantially homogeneous solid.

2. Method of preparing an insect repellent stick which comprises heating, until a clear melt is obtained, a mixture consisting essentially of from about 65 to 75 parts of 2-ethylhexanediol-1,3, from about 18 to 23.4 parts of a mixture of approximately equal parts of stearic and palmitic acids and from about 7 to 11.6 parts of ozokerite wax, all parts by weight, pouring the melt into molds while it is clear and hot, and cooling the melt in the molds to a substantially homogeneous solid.

3. Method of preparing an insect repellent stick from components consisting essentially of from about 65 to 75 parts of an insect repellent, from about 18 to 23.4 parts of fatty acid, and from about 7 to 11.6 parts of ozokerite wax, the repellent comprising about 30 percent 2-ethylhexanediol-1,3 and about 70 percent of a member selected from the group consisting of 2-ethylhexanediol-1,3, ortho-dimethyl phthalate, 2-cyclohexylcyclohexanol, 2-phenylcyclohexanol and mixtures thereof, the fatty acid being a mixture of stearic acid and palmitic acid containing from about 26 parts to 70 parts of stearic acid, all parts by weight, which method comprises heating the wax, fatty acids and a portion of the repellent until a homogeneous fluid melt is obtained, adding the remainder of the repellent and holding the mix at a temperature sufficiently high to give a homogeneous, clear, fluid melt, pouring the melt into molds while it is clear and hot, and cooling the melt in the molds to a substantially homogeneous solid.

4. Method of preparing an insect repellent stick from components consisting essentially of from about 65 to 75 parts of 2-ethylhexanediol-1,3, from about 18 to 23.4 parts of a mixture of approximately equal parts of stearic and palmitic acids and from about 7 to 11.6 parts of ozokerite wax, all parts by weight, which method comprises heating the wax, fatty acids and a portion of the repellent until a homogeneous fluid melt is obtained, adding the remainder of the repellent and holding the mix at a temperature sufficiently high to give a homogeneous, clear, fluid melt, pouring the melt into molds while it is clear and hot, and cooling the melt in the molds to a substantially homogeneous solid.

5. An insect repellent stick consisting essentially of from about 65 to 75 parts of an insect repellent, from about 18 to 23.4 parts of fatty acid, and from about 7 to 11.6 parts of ozokerite wax, the repellent comprising about 30 percent 2-ethylhexanediol-1,3 and about 70 percent of a member selected from the group consisting of 2-ethylhexanediol-1,3, ortho-dimethyl phthalate, 2-cyclohexylcyclohexanol, 2-phenylcyclohexanol and mixtures thereof, the fatty acid being a mixture of stearic acid and palmitic acid containing from about 26 parts to 70 parts of stearic acid, all parts by weight, said stick being substantially free of water and alcohol.

6. An insect repellent stick consisting essentially of from about 65 to 75 parts of 2-ethylhexanediol-1,3, from about 18 to 23.4 parts of a mixture of approximately equal parts of stearic and palmitic acids and from about 7 to 11.6 parts of ozokerite wax, all parts by weight, said stick being substantially free of water and alcohol.

References Cited in the file of this patent

UNITED STATES PATENTS 2,465,470    Omohundro _____ Mar. 29, 1949

FOREIGN PATENTS 606,087    Great Britain _____ Aug. 5, 1948

OTHER REFERENCES

Schimmel: Briefs, No. 137, August 1947.
Poucher: Perfumes, Cosmetics and Soaps, vol. 3, 6th ed., 1942, p. 97.
Drug and Cos. Ind., vol. 52, February 1943, pp. 203 and 205.
Chilson: Modern Cos., 1938, pp. 21 to 24.